United States Patent [19]

McSweeney

[11] Patent Number: 5,232,626
[45] Date of Patent: Aug. 3, 1993

[54] PROCESS FOR MAKING APATITIC PHOSPHORS

[75] Inventor: Robert T. McSweeney, Wakefield, Mass.

[73] Assignee: GTE Products Corp., Stamford, Conn.

[21] Appl. No.: 902,125

[22] Filed: Jun. 22, 1992

[51] Int. Cl.$^5$ .............................................. C09K 11/73
[52] U.S. Cl. ....................... 252/301.4 P; 252/301.4 H
[58] Field of Search ............... 252/301.4 P, 301.6 P, 252/301.4 H

[56] References Cited

U.S. PATENT DOCUMENTS

| | | | |
|---|---|---|---|
| 2,862,888 | 12/1958 | Ross | 252/301.4 P |
| 3,109,819 | 11/1963 | Gillooly et al. | 252/301.6 P |
| 3,639,253 | 1/1970 | Gillooly | 252/301.4 P |
| 4,806,824 | 2/1989 | Paynter et al. | 313/486 |

FOREIGN PATENT DOCUMENTS

| | | | |
|---|---|---|---|
| 0239924 | 10/1987 | European Pat. Off. | |
| 52-58086 | 5/1977 | Japan | 252/301.4 P |
| 55-155084 | 12/1980 | Japan | 252/301.4 P |
| 1371968 | 10/1974 | United Kingdom | |

*Primary Examiner*—Jack Cooper
*Attorney, Agent, or Firm*—Robert E. Walter

[57] ABSTRACT

In a method of preparing an alkaline earth halophospor having an antimony content greater than about 0.70 weight percent, a uniform mixture of starting raw materials is fired with already fired phosphor of the desired alkaline earth halophosphate so that the already fired phosphor is refired in an inert atmosphere containing volatile species from the uniform mixture of starting raw materials.

2 Claims, No Drawings

PROCESS FOR MAKING APATITIC PHOSPHORS

TECHNICAL FIELD OF THE INVENTION

This invention relates to fluorescent lamps and fluorescent lamp phosphors.

BACKGROUND OF THE INVENTION

Apatitic phosphors such as Cool White haloapatite phosphors exhibit a decrease in brightness and relative quantum efficiency when their soluble antimony content increases much beyond 0.70 weight percent and they are fired in an inert atmosphere. A decrease in brightness also typically occurs when haloapatite phosphors are ball milled or attritor milled or otherwise particle size reduced. Since Cool White phosphors having higher soluble antimony content and finer particle sizes should, at least theoretically perform better in lamps at lower powder weights, it is desirable to offset any decrease in brightness due to increased antimony content or milling.

European Patent Application 0 239 924 to Gillooly et al describes a calcium halophosphate phosphor having the formulation $Ca_{10-a-w-x}Cd_wMn_xSb_a(PO_4)_6F_{2-a-y}Cl_yO_a$ where a is from 0.1 to 0.2, w is from 0 to 0.2, x is from 0.15 to 0.5, and y is from 0.03 to 0.3. As set forth in the specification, as compared to calcium halophosphate phosphor having an antimony contend below about 0.10 mole per mole of phosphor, the process of the European Application modifies the synthesis of the phosphor. Phosphor synthesis is performed by utilizing a low oxygen content atmosphere, i.e. 50–5000 ppm, during both steps of a two step firing process. After the first firing, the phosphor is milled before the second firing. U.S. Pat. No. 4,806,824 describes a dual coat phosphor coating layer using the above phosphor.

U.S. Pat. No. 3,639,253 to Gillooly describes the preparation of an antimony-doped calcium pyrophosphate intermediate by reacting $CaHPO_4$ and $SbO_3$, and the resulting $Ca_2P_2O_3 \cdot xCa(SbO_3)_2$ is used along with, for example, $CaCO_3$ $CaF_2$ to produce antimony-doped phosphors having a bluish color. Cool white and warm white phosphors can be produced as known the art by using $CaCl_2$ and $MnCO_3$ as additional ingredients. The firing technique utilizes open silica dishes in the presence of oxygen. A second firing step as discussed in the example utilizes an inert atmosphere such as nitrogen.

SUMMARY OF THE INVENTION

It is an object of the present invention to minimize the brightness decrease which occurs in processing due to firing and milling alkaline earth metal halophosphors having an antimony content greater than about 0.70 weight percent or greater than about 0.06 moles antimony based on a chemical formula having six phosphate groups.

This invention achieves these and other results by providing a method of preparing an alkaline earth halophospor of a desired formulation having an antimony content greater than about 0.70 weight percent by the steps of:

forming a uniform mixture of starting raw materials in sufficient amounts to produce a alkaline earth halophosphate;

firing said mixture in a furnace atmosphere with an already fired alkaline earth halophosphate of the desired formulation;

said firing being carried out at a suitable temperature wherein said already fired desired alkaline earth halophosphate is refired in an atmosphere containing volatile species from said uniform mixture.

The refiring desirably enhances the brightness of the resulting phosphor.

According to preferred embodiments, the already fired phosphor is milled prior to refiring. In accordance with other preferred embodiments, the blend may include $NH_4Cl$, $CaF_2$, $CaCl_2$ and mixtures thereof.

DETAILED DESCRIPTION

In fluorescent lamps, the inner surface of the elongated glass bulb is coated with phosphor with the phosphor coating typically covering the entire length of the inner wall of the bulb. One of the factors considered during the phosphor coating operation is that the coating be effected to the extent required to obtain the desired degree of light output. Phosphor materials which result from these combinations generally exhibit good luminescence when stimulated by short (253.7 nanometers) ultraviolet radiation, the response being greatest when the materials are synthesized to produce small deviations from stoichiometry. In particular, activation by combinations of antimony and manganese will produce a wide spectrum of luminescent emissions from alkaline earth phosphates excited by ultraviolet light.

Alkaline earth halophosphates are typically activated by antimony and manganese. They have the general formula $Ca_5(F_{1-x}Cl_x)(PO_4)_3$:Sb:Mn as specifically described in U.S. Pat. No. 4,897,217 to Jackson.

These phosphors have wide application fluorescent lamps and may be adjusted in composition to provide white light which varies from "cool" to "warm" white. Typical phosphors are "Warm White", Sylvania ™ Type 4300 and "Cool White", Sylvania ™ Type 4450.

In particular, the present invention is directed to phosphors of the above type having an antimony content greater than about 0.70 weight percent. Such phosphors have a general formula $Ca_{10-x-z}Mn_xSb_z(F_{2-y-z}Cl_yO_z)(PO_4)_6$ where x is from 0.15 to 0.5, z is from about 0.06 to about 0.2, and y is from 0.0 to 0.4. Preferably the z constituent is greater than 0.06 so as to result in a greater than about 0.70 weight percent antimony.

Refiring apatitic phosphors in an atmosphere of air or nitrogen typically results in degrading their brightness. This is especially the case when the refiring temperature is in the range of 750° C. to 1100° C. for typical firing times of about 10 minutes to about several hours.

The refiring method of the present invention enhances the brightness and relative quantum efficiency of calcium halophosphates with high antimony content. This improvement also applies to such phosphors which have been attritor milled prior to refiring to obtain a finer particle size. Although milling apatitic phosphors typically reduces their brightness, the method of the present invention may be used to desirably enhance or restore brightness and relative quantum efficiency.

In accordance with the refiring method of the present invention, the phosphor is refired in an atmosphere similar to the atmosphere in which it was originally fired. Such atmosphere includes volatile species which are typically released from the raw starting materials into an atmosphere during firing. The preferred atmosphere comprises an inert gas such as nitrogen. Typical volatile species comprise $H_2O$, $CO_2$, $Sb_2O_4$, $SbCl_3$. It is believed that additional volatile species include $H_2$ and CO. Such volatile species desirably create a mildly reducing atmosphere which reduces the presence of deleterious oxides in the refired phosphor.

As an example of the present invention, several groups of Cool White phosphors were refired in a furnace including a separate boat or vessel containing an unfired blend of raw materials of the same type of phosphor. The equipment utilized included a normal tube firing with two boats placed in the hot zone of the furnace. During firing a flowing nitrogen atmosphere was provided through the tube. A gas inlet and outlet were respectively provided so that nitrogen sweeps over the mixture of raw materials first whereby the atmosphere become enriched in the volatile compounds during the heating. The resulting inert gas including volatile components is passed over the boat containing the phosphor to be refired. It is theorized that a quasi-equilibrium is established. Refiring times of about 10 to about 60, preferably about 20 minutes to about 30 minutes at temperatures between 1025 degrees and 1100 degrees Centigrade are utilized but the present invention is operable at higher or lower temperatures.

In accordance with preferred embodiments, it may be desirable to add additional volatilizing constituents to the blend of raw materials and/or the phosphor being refired for enhancing the brightness of the refired phosphor. It is theorized that the defects which degrade phosphor brightness involve halogen vacancies. Removal of the vacancies are believed to result in improved performance of the resulting refired phosphor. Preferably raw material blend have a high halogen content or activity. Blends of the phosphors to be refired containing initially fired, crushed and sieved phosphor with approximately 2.0 weight percent $NH_4Cl$ or 0.50 weight percent $CaF_2$ or 0.35 $CaCl_2$ or combinations of these constituents are most preferred.

The results of the firings shown in Table I indicate that the $NH_4Cl$ addition is preferable. Although the other components, $CaF_2$ or $CaCl_2$, do not have as pronounced an effect on brightness or quantum efficiency they do improve these properties and can be used to shift the y-color coordinate down or up, respectively. As an added benefit refiring alone or with the compound additions lowers or totally removes the concentration of detectable $CaSb_2O_6$ or $Sb_2O_4$. These compounds are desirably absent so as to enhance the maintenance.

The first, number 1, test reported in Table 1 involves the composition HTMO which is a composition according to the above formula having a z value of about 0.071, a y value of about 0.10, and an x value of 0.18 and blend of four phosphors fired. The blend was subsequently crushed, sieved past 400 mesh and acid-base washed. These materials had detectable levels of $Sb_2O_4$ present and in the resulting apatitic phosphor as determined by acid dissolution and x-ray analysis of the insoluble residue.

In the subsequent tests reported in Table 1, experiments 2 to 6 and 9 and 10, the composition set forth were refired in a boat preceded by a separate boat containing an unfired blend of raw materials, composition H342, a dical-based composition designed to form an apatitic phosphor having a composition similar to HTMO. The raw material blend was placed in the tube furnace so that nitrogen gas sweeps over the raw material blend so as to pick up volatile components before contacting the once fired phosphor compositions set forth in experiments 2 to 10.

As set forth in Table 1, column one sets forth the composition being fired. Column 2 sets forth the firing conditions. Column 3 sets forth the weight percent antimony in the composition after firing. Column 4 and 5 provide measurements of relative brightness and relative quantum efficiency as measured relative to a standard phosphor having an antimony content where $z=0.054$ in the formula previously set forth. The last column sets forth the y-color coordinate on the CIE chromaticity diagram.

The first four apatitic refired phosphors (compositions 2 to 5) shown in Table 1 after HTMO (initially fired) were all refired at 1025° C. for 20 minutes together. They were all fired with various amounts of additives as set forth in the Table. The firing conditions were about 1025° C. for about 20 minutes under flowing nitrogen so as pick up the volatile by-products from the raw material mix. Composition HTMO-A/F662 (experiment 2), the $NH_4Cl$ modified material, shows the largest improvement of the HTMO based materials of experiments 2 to 5. The other refired materials with the possible exception of HTMO-D/F665 also exhibit improved brightness and relative quantum efficiency by about 3.0 percent in unmilled, washed phosphors. In addition, no trace of $Sb_2O_4$ was found in the refired HTMO or HTMO-A compositions.

Another set of tests was performed on a fired and attritor milled composition H342 (having an antimony content of about 1.0 wt. % or a $z=0.083$), also shown in Table I. The initial fired composition showed better brightness and relative quantum efficiency when fired at 1100° C. rather than 1025° C. but the inferior performance underfired phosphor as shown in the Table was dramatically improved by refiring. Both the 1025° C. and the 1100° C. fired phosphors had an initial mean value particle size of about 15 microns as measured by the Leeds and Northrup Microtrac and high antimony retention levels near 1.00 weight percent. After attritor milling for 30 minutes the mean particle size was reduced from about 15 microns to the 9 to 10 micron range while the brightness was only slightly affected.

The milled material, having a brightness of 90.4 percent and a relative quantum efficiency of 91.7 percent was then mixed with 2.0 weight percent $NH_4Cl$ and 0.25 wt. percent $CaF_2$ and refired at either 1100° C. for 30 minutes or at 1050° C. for 20 minutes. The resulting materials showed a remarkable improvement in both brightness and in relative quantum efficiency, as is shown in Table I, with the higher temperature refiring being more productive but resulting in slightly lower antimony content. The refiring only slightly increased the mean value particle size to about 12 microns and moderately decreased the antimony retention levels. These findings show that the performance of milled phosphors can be improved by refiring in a nitrogen atmosphere containing the volatile components from an initial phosphor firing. Initial firing temperatures near 1100° C. are preferred whereas lower refiring temperature result in less antimony being removed on refiring. The most preferred refiring temperature is from 1050° C. to about 1100° C.

TABLE 1

Initial and Refired Haloapatite Phosphor Compositions

| Composition | Firing Conditions | Weight % $Sb^{+3}$ | % Rel. Bright | % Rel. Quan. Eff. | Y-color coord. |
|---|---|---|---|---|---|
| 1) HTMO | single fired | 0.88 | 98.8 | 96.9 | 0.4108 |
| 2) HTMO/F661 | refired at 1025° C., 20 min preceded by raw blend H342 | 0.85 | 103.1 | 99.3 | 0.4107 |
| 3) HTMO-A/F662 | refired as in 2) above with 2 wt. % $NH_4Cl$ | 0.84 | 104.0 | 100.1 | 0.4105 |
| 4) HTMO-B/F663 | refired as in 2) above with .5 wt. % $CaF_2$ | 0.81 | 102.4 | 100.1 | 0.4129 |
| 5) HTMO-C/F664 | refired as in 2) above with .25 wt. % $CaCl_2$ | 0.82 | 102.3 | 98.5 | 0.4088 |
| 6) HTMO-D/F665 | refired as in 2) above with all additives as set forth in 3, 4 and 5 | 0.73 | 99.1 | 97.0 | 0.4139 |
| 7) H342/F655-61 | single fired | 1.00 | 91.7 | 89.7 | 0.4067 |
| 8) H342M4-A | single fired material that has been att. milled, $NH_4Cl$, $CaF_2$ additions | 1.00 | 90.4 | 91,7 | 0.4071 |
| 9) H342M4-A/F/671 | refired as in 2) above but at 1100° C., 30 min | 0.80 | 98.6 | 98.3 | 0.4125 |
| 10) H342M4-A/F674 | refired as in 2) above but at 1050° C., 30 min | 0.85 | 97.5 | 98.0 | 0.4124 |

I claim:

1. A method of preparing an alkaline earth halophosphor having an antimony content greater than about 0.70 weight percent and having the general formula $Ca_{10-x-z}Mn_xSb_z(F_{2-y-z}Cl_yO_z))(PO_4)_6$, where x is from 0.15 to 0.5, z is from greater than about 0.06 to about 0.2 and y is from 0 to 0.4, by the steps of:

forming a first vessel containing a uniform mixture of starting raw materials in sufficient amounts to produce an alkaline earth halophosphate of a similar formulation;

forming a second vessel containing an already fired alkaline earth halophosphate of said formula;

placing said first and said second vessels in a furnace having an inlet and outlet wherein an inert gas flows over said first vessel and then flows over said second vessel;

firing said mixture of starting raw materials and said already fired alkaline earth halophosphate in said furnace, said firing being carried out at a temperature from about 1025 degrees to about 1100 degrees Centigrade wherein said already fired alkaline earth halophosphate is refired in an atmosphere containing volatile species comprising $H_2O$, $CO_2$, $Sb_2O_4$, $SbCl_3$, $H_2$ and CO produced from said uniform mixture of said starting raw materials.

2. A method according to claim 1 wherein said inert gas comprises nitrogen.

* * * * *